May 1, 1934.  D. S. WILLSON  1,957,418
GAS SEPARATOR
Filed Jan. 27, 1931  3 Sheets-Sheet 2
FIG. III.
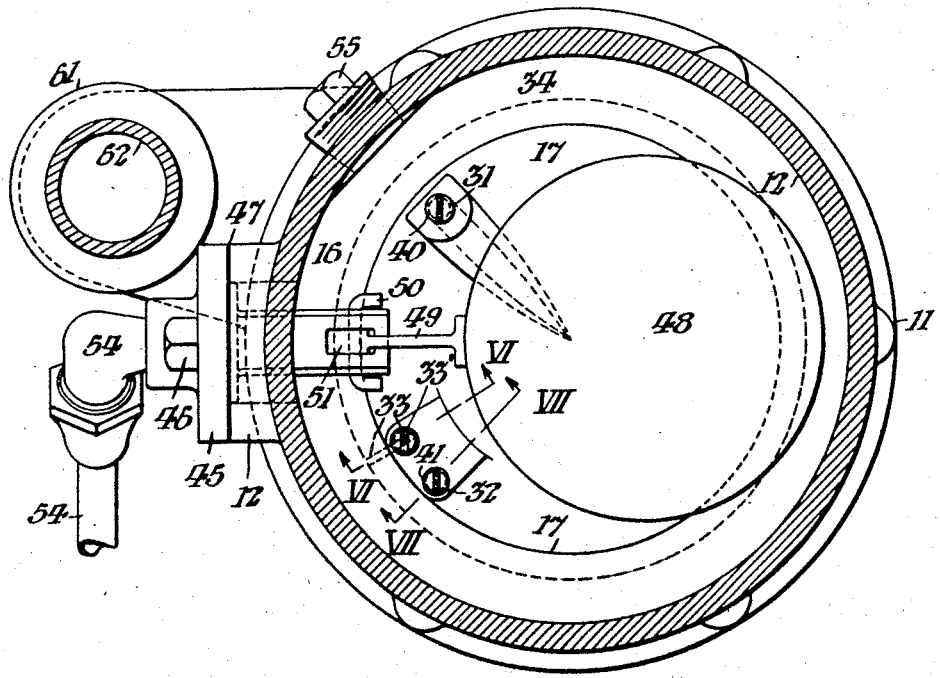
FIG. IV.
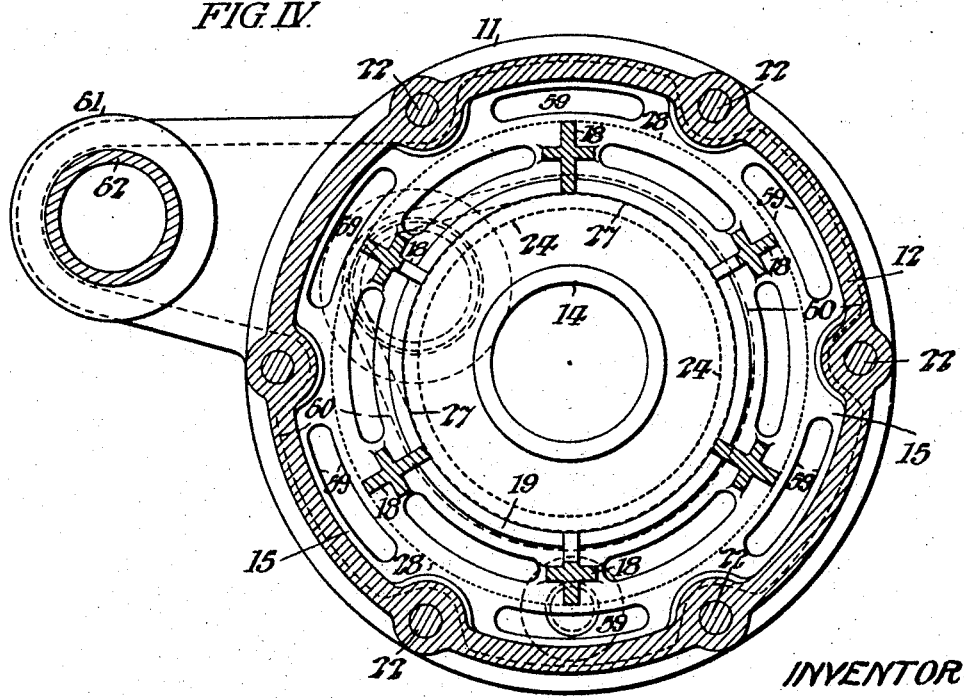
INVENTOR:
DAVID S. WILLSON,
BY
ATTORNEY.

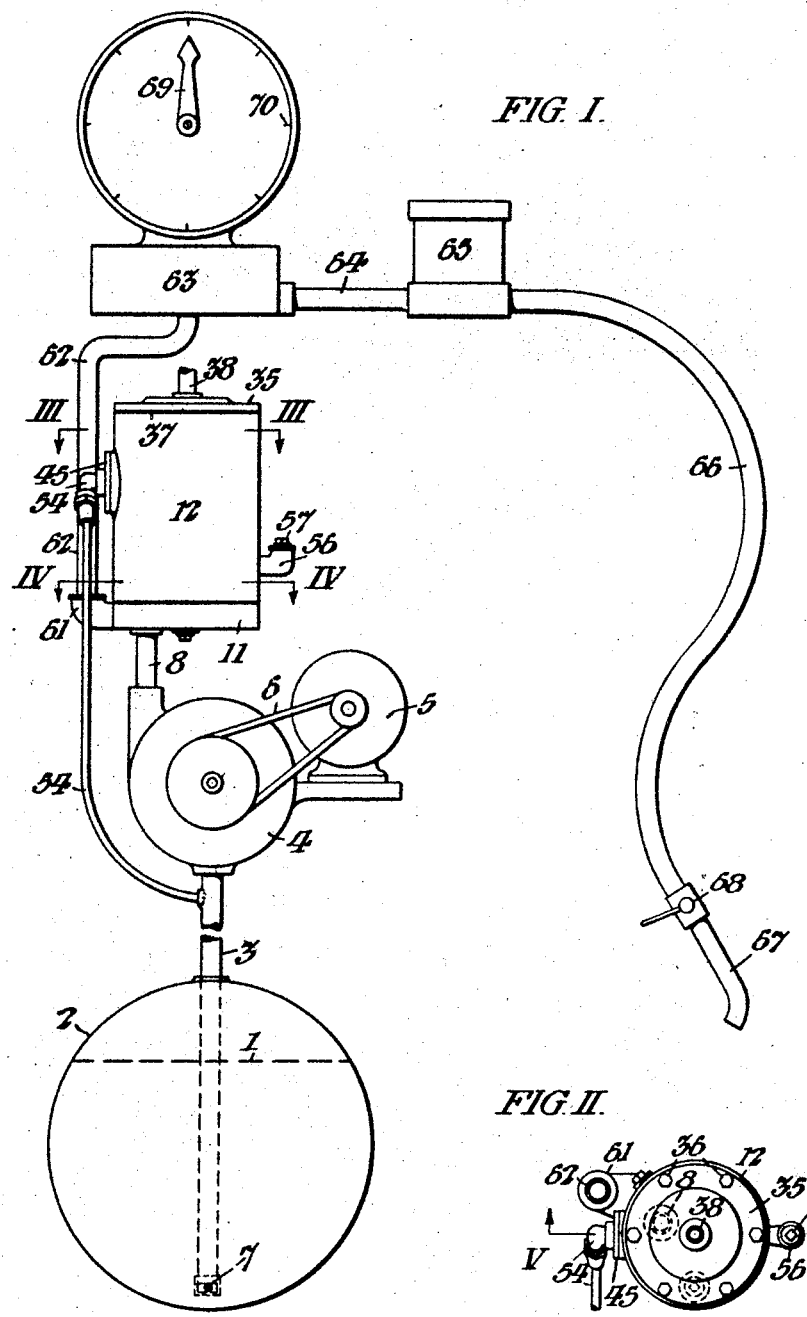

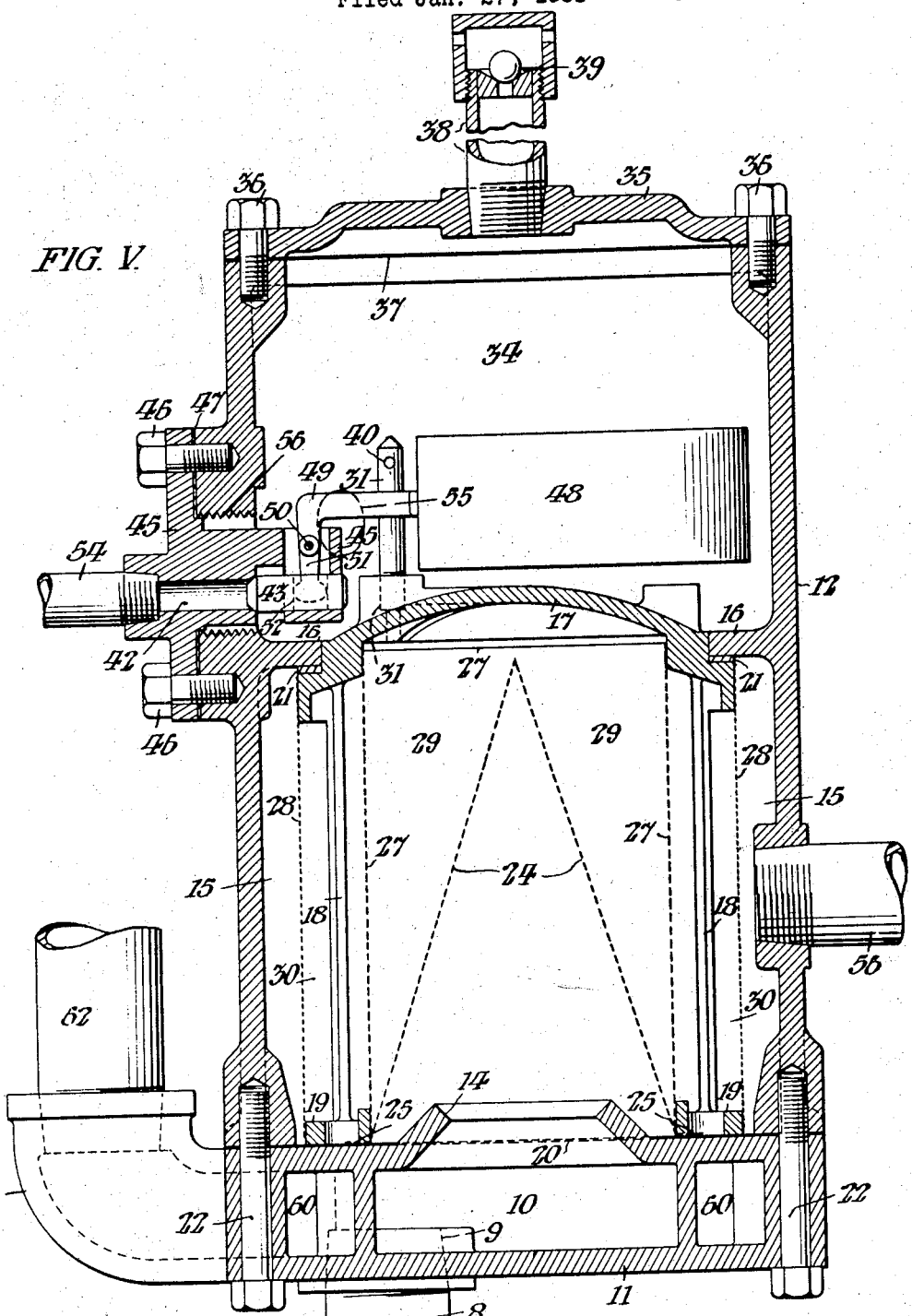
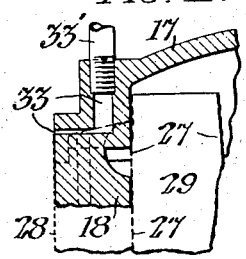
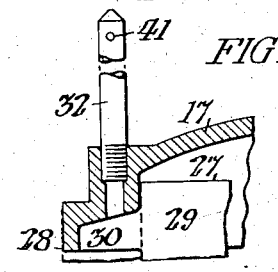

Patented May 1, 1934

1,957,418

UNITED STATES PATENT OFFICE

1,957,418

GAS SEPARATOR

David S. Willson, Conshohocken, Pa., assignor to Service Station Equipment Company, Conshohocken, Pa., a corporation of Delaware Application January 27, 1931, Serial No. 511,498

3 Claims. (Cl. 183—2.5)

My invention may be advantageously employed in apparauts for dispensing gasolene by means of a pump which extracts the liquid from a subjacent tank and delivers it under pressure through a meter and dispensing hose. Said meter includes a rotatable index pointer adapted to traverse a circular series of graduations on a dial to indicate gallons and fractions thereof dispensed, and said pointer is turned by the flow of liquid through said meter. In some localities the law requires the inclusion of a transparent container between the pump and the hose through which the liquid must pass and in which the purchaser may observe whether or not liquid is being delivered to the hose. If there is a leak in the suction line from the subjacent tank to the pump, air is drawn into the liquid conduit and is manifested by bubbles in the liquid passing through the container and, under some circumstances, bubbles of vapor of the liquid being dispensed may similarly appear. Of course, the passage of air or other gas through the metering device, in lieu of the liquid, renders the manifestation of the amount dispensed erroneous. Therefore, the principal purpose and effect of my invention is to insure the delivery of liquid without the inclusion of bubbles of air or vapor and to the full amount indicated by the meter.

As hereinafter described, the essential feature of my invention is that means are provided for separating the liquid from any lighter fluid, such as air or vapor of the liquid, on its way from the subjacent tank to the meter and to insure that only liquid shall be delivered to the meter and dispensed therethrough. Such means include what I hereinafter term a gas eliminator in the liquid supply conduit leading from the pump to the meter and which includes one or more foraminous screens through which the liquid is pumped with the effect of separating air and other gas bubbles from it in gas trap chambers between said screens, and between the outermost screen and the surrounding casing. The gas thus separated rises to the top of said gas trap chambers and escapes therefrom into a gas vent chamber above them, which has a vent conduit leading from the top thereof to the atmosphere. Such escape of the gas from said trap chambers into said vent chamber is conveniently effected through passages which may be provided with jet tubes extending upwardly from the floor of said vent chamber and having discharge orifices near their tops; so that the gas is discharged above the liquid in the lower portion of said gas vent chamber, which is a temporary receptacle for the liquid entrained with the gas bubbles delivered through said passages or jets. The lower portion of said vent chamber has a liquid drain outlet normally closed by a valve, controlled by a float; so that whenever the liquid trapped in said vent chamber rises to a predetermined level, said valve is opened to permit the liquid contents of said vent chamber to be drawn, practically free from gas, through a conduit leading back to the suction side of said liquid pump.

My invention includes the various novel features of construction and arrangement hereinafter more definitely specified.

In said drawings; Fig. I is a diagram showing the essential elements of an apparatus embodying this invention. Fig. II is a plan view of the gas eliminator shown in Fig. I. Fig. III is a plan sectional view of said gas eliminator, taken on the line III, III in Fig. I, but on a larger scale. Fig. IV is a plan sectional view of said gas eliminator, taken on the line IV, IV in Fig. I, but on the same scale as Fig. III. Fig. V is a vertical sectional view of the gas eliminator indicated in Figs. I, II, and III, but on the larger scale. Fig. VI is a fragmentary vertical sectional view of the screen frame, taken on the line VI, VI in Fig. III. Fig. VII is a fragmentary vertical sectional view of said screen frame, taken on the line VII, VII in Fig. III.

In said figures; the liquid 1 to be dispensed is stored in the underground tank 2 from which it is withdrawn through the conduit 3 by and to the pump 4 which is conveniently electrically operated by the motor 5 connected therewith by the belt 6. Said conduit 3 is provided with the check valve 7 to normally prevent return of liquid therethrough to said tank, and said pump 4 discharges the liquid through the conduit 8 and the port 9 into the inlet chamber 10 in the hollow base 11 of the gas eliminator casing 12. The liquid passes from said chamber 10 upwardly through the conical nozzle 14 into the screen chamber 15 in said casing 12 below the closure including the annular flange 16 in said casing 12 and the circular head 17 of the screen supporting frame which comprises a circumferential series of six vertical standards 18 connecting said head in unitary relation with the bottom ring 19 which rests upon the gasket 20 at the top of said base 11. The joint between said flange 16 and head 17 is sealed by the gasket 21 when said base 11 is rigidly connected with said casing 12 by the circular series of tap bolts 22 which extend through said base 11 in screw threaded engagement with said casing 12, as indicated in Fig. V.

Said screen chamber 15 contains, immediately surrounding said nozzle 14, the conical screen 24 which may be conveniently formed of wire netting of 50 x 50 mesh per inch; said screen 24 having an annular flange 25 held between said screen frame ring 19 and gasket 20.

Said conical screen 24 is surrounded by the cylindrical screen 27 which may be formed of the same material and which is supported at its upper end by said head 17 and at its lower end by said ring 19 of the screen supporting frame. Said ring 19 has a circular series of arcuate openings through it between said standards 18, as indicated in Figs. IV and V, merely to lessen the weight thereof; said openings being closed at the bottom by the top wall of the hollow base 11, as shown in Fig. V. The cylindrical screen 28 is supported in concentric relation with said screen 27 by said screen supporting frame head 17 and its bottom ring 19, and that screen is preferably of much finer mesh than the other two; for instance, 150 x 150 mesh per inch. Said unitary frame, comprising the head 17, the circular series of six standards 18 which form a cage, as shown in Fig. IV, and the base ring 19, thus supports all three screens 24, 27, and 28 in the coaxial relation indicated in Fig. V.

There is thus formed between the conical screen 24 and the cylindrical screen 27 an inner gas trap chamber 29, and between said screen 27 and the screen 28 an intermediate gas trap chamber 30 within said outer screen chamber 15, and the air or other gas entrained with the liquid rising through the nozzle 14 is separated therefrom at the top of said chambers 15, 29, and 30. Such gas escapes from said chamber 29 through the jet tube 31, shown in Figs. III and V, and from said chamber 30 through the jet tube 32, shown in Figs. III and VII, and from said chamber 15 through the small jet duct 33. Said jet tubes 31 and 32 are of different lengths but preferably extend to about the same height above the normal liquid level above said flange 16 and head 17, which form the floor of the gas vent chamber 34 in said casing 12. Said chamber 34 has the removable lid 35 normally rigidly connected with said casing 12 by the circular series of tap bolts 36. The gasket 37 seals the joint between said casing 12 and said lid 35, but the latter is provided with the gas vent conduit 38, conveniently leading to the atmosphere above any liquid level in the apparatus. A check valve 39 is normally provided in the vent conduit 38 to allow free discharge of gas to atmosphere, but to close upon reduction of pressure, within chamber 34, slightly below atmosphere to prevent rapid draining of system due to entry of air through vent conduit 38. All of the gas separated from the liquid is thus eliminated from the apparatus through said vent conduit 38.

Said jet tubes 31 and 32 have outlet orifices 40 and 41 preferably near their tops and at approximately the same level, so that the major portion of the gas is discharged above the liquid in the lower portion of said vent chamber 34 which is a temporary receptacle for the liquid entrained with the gas bubbles delivered through said jet orifices 40 and 41, and also through passage 33, as shown in Fig. VI, which may or may not be fitted with a jet tube 33'.

The lower portion of said vent chamber 34 which is thus utilized as a temporary liquid receptacle has the liquid drain outlet port 42 which is normally closed by the reciprocatory plunger valve 43 which is mounted in the valve casing 45 detachably rigidly connected with said casing 12 by the two tap bolts 46; the joint between said casings 12 and 45 being sealed by the gasket 47. Said valve 43 is normally held closed, in the position shown in Fig. V, by the weight of the float 48 which is rigidly connected with the lever 49 fulcrumed on the pin 50 in said valve casing 45 and having its arm 51 engaged in a recess 52 in said valve 43.

It is to be understood that the construction and arrangement of said float valve are such that when the liquid trapped in the lower portion of said gas vent chamber 34 rises to a predetermined level, it uplifts said float 48 and withdraws said valve 43 from said port 42 and permits the escape of said liquid through said port. Said port 42 is in communication with the conduit 54 which, as shown in Fig. I, leads back to the suction side of said pump 4; so that whenever the pump is operated, a partial vacuum is created in said conduit 54 to effect the rapid withdrawal of the liquid from said vent chamber 34 without entraining any considerable amount of air or gas therewith; the arrangement being such that said valve 43 is closed by the weight of said float 48 before the liquid in said chamber 34 is withdrawn to the level of said port 42.

It may be observed that the construction and arrangement are such that said eliminator casing 12 may be detached from its base 11 to afford access to the screens 24, 27, and 28 to permit them to be readily cleaned.

As indicated in Fig. I, I find it convenient to provide said casing 12 with the priming connection including the elbow 56 and removable screw plug 57; to permit said screen chamber 15 to be primed with the liquid to be dispensed, when desired.

The liquid which passes from said inlet chamber 10 through said conical nozzle 14 into the screen chamber 15 and through the screens 24, 27, and 28 as above described, escapes from said chamber 15 through one or more outlet ports 59 in the top of said base 11 into the outlet chamber 60 surrounding said inlet chamber 10, and thence through the elbow 61 into the conduit 62 leading to the meter 63 and thence through the conduit 64 and sight gage 65 to the flexible dispensing hose 66 which has the discharge nozzle 67 provided with the valve 68. Said meter may be of any suitable construction capable of causing the rotary hand 69 to turn with reference to the circular series of graduations 70 to indicate the amount of liquid dispensed, as aforesaid.

It is to be particularly noted that even if said valve 7 leaks enough to drain the screen chamber 15 when the apparatus is idle; the liquid dispensing conduit leading from said chamber to the nozzle valve 68 will remain primed with liquid; for the nozzle 14 projects above said outlet ports 59 far enough to prevent back drainage of liquid through said inlet chamber 10 from said outlet chamber 60 and said dispensing conduit.

Although I prefer to embody my invention in apparatus such as described, wherein the liquid residue in the gas vent chamber is discharged to the suction side of the pump solely under control of a float valve 43; the screw plug 55 shown in Fig. III closing an opening in the casing 12, may be removed and a pipe extended from that opening back to the storage tank 2, to drain said residue directly to the latter. Moreover, if such a drain is used, said float valve and its appurtenances including the casing 45 and conduit 54 may be omitted and the opening through which said casing 45 extends, as shown in Fig. V be closed by a pipe plug, engaging the screw thread 56 in said casing 12.

Therefore, I do not desire to limit myself to the precise details of construction and arrangement or method of operation herein set forth, as it is obvious that various modifications may be made therein without departing from the essential features of my invention, as defined in the appended claims.

I claim:

1. Apparatus for separating liquid from gas entrained therein, including a screen chamber having a liquid inlet and outlet, a gas vent chamber above said screen chamber, and gas conducting means connecting said chambers, including a jet tube extending above the floor of said vent chamber; a gas vent leading from said vent chamber above said jet tube and directly to the atmosphere; and a liquid drain outlet from said vent chamber below the top of said jet tube; whereby the lower portion of said vent chamber may be used as a trap for liquid precipitated from the gas discharged through said jet tube; wherein said screen chamber and vent chamber are formed in a single casing, having an internally projecting annular flange between said chambers; a screen supporting frame fitted in said casing in registry with said flange and separating said chambers; a plurality of foraminous screens separated by said frame; a hollow base for said casing, containing the liquid inlet and outlet ports; and means in said hollow base between said inlet and outlet ports whereby liquid is directed from said inlet port through said screens to said outlet port.

2. Apparatus for separating liquid from gas entrained therein, including a screen chamber having a liquid inlet and outlet, a gas vent chamber above said screen chamber, and gas conducting means connecting said chambers, including a jet tube extending above the floor of said vent chamber; a gas vent leading from said vent chamber above said jet tube and directly to the atmosphere; and a liquid drain outlet from said vent chamber below the top of said jet tube; whereby the lower portion of said vent chamber may be used as a trap for liquid precipitated from the gas discharged through said jet tube; comprising a screen supporting frame including a circular series of standards forming a cage; and a plurality of screens supported by said frame respectively inside and outside of said cage.

3. In a gas separator; a screen supporting frame comprising a circular head, a circular base ring, and a circular series of standards connecting said head and base ring in unitary relation and forming a cage; of three screens supported by said frame including, first, a cylindrical screen exterior to said head and ring, second, a cylindrical screen fitted within said base ring in engagement with said head, and, third, a conical screen fitted within said second screen.

DAVID S. WILLSON.